United States Patent
Dantrey et al.

(10) Patent No.: US 10,412,529 B1
(45) Date of Patent: Sep. 10, 2019

(54) METHOD AND SYSTEM FOR IMMERSIVE VIRTUAL REALITY (VR) STREAMING WITH REDUCED GEOMETRIC ACOUSTIC AUDIO LATENCY

(71) Applicant: NVIDIA CORPORATION, Santa Clara, CA (US)

(72) Inventors: Ambrish Dantrey, Pune (IN); Anshul Gupta, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/034,203

(22) Filed: Jul. 12, 2018

(51) Int. Cl.
H04S 7/00 (2006.01)
G06F 3/16 (2006.01)
H04L 29/06 (2006.01)

(52) U.S. Cl.
CPC ............. *H04S 7/303* (2013.01); *G06F 3/165* (2013.01); *H04L 67/38* (2013.01)

(58) Field of Classification Search
CPC ........... H04S 7/303; G06F 3/165; H04L 67/38
See application file for complete search history.

(56) References Cited

U.S. PATENT DOCUMENTS

| 9,843,883 B1 * | 12/2017 | Su ........................ H04S 7/304 |
| 9,940,922 B1 * | 4/2018 | Schissler ................ H04S 7/305 |
| 2017/0295446 A1 | 10/2017 | Thagadur Shivappa |
| 2018/0046431 A1 | 2/2018 | Thagadur Shivappa et al. |

OTHER PUBLICATIONS

Micah T. Taylor; et al., RESound: Interactive Sound Rendering for Dynamic Virtual Environments, *Project wepage: http://gamma.cs.unc.edu/Sound/RESound, MM09, Oct. 19-24, 2009, Beijing, China, Copyright 2009 ACM 978-1-60558-608-3/09/10, 10 pages.

Benoit Alary, Auralizing soundscapes through virtual acoustics, http://blog.audiokinetic.com/auralizing-soundscapes-through-virtual-acoustics, 22 pages, Feb. 14, 2017.

Qualcomm, On-device motion tracking for immersive mobile VR, Qualcomm Technologies, Inc., Aug. 2017, 24 pages.

Nicolas Tsingos, Pre-computing geometry-based reverberation effects for games, Dolby Laboratories, San Francisco, CA, USA, AES 35th International Conference, London, UK, 2009 Feb. 11-13, 10 pages.

Dmitry N. Zotkin; et al., Rendering Localized Spatial Audio in a Virtual Auditory Space, IEEE Transacations on Multimedia, vol. 6, No. 4, Aug. 2004, 12 pages.

* cited by examiner

*Primary Examiner* — Andrew L Sniezek

(57) ABSTRACT

A virtual reality (VR) audio rendering system and method using pre-computed impulse responses (IRs) to generate audio frames in a VR setting for rendering. Based on a current position of a user or a VR object, a set of possible motions are predicted and a set of IRs are pre-computed by using a Geometric Acoustic (GA) model of a virtual scene. Once a position change is actually detected, one of the pre-computed IRs is selected and convolved with a set of audio frames to generate modified audio frames for rendering. As the modified audio frames are generated by using pre-computed IR without requiring intensive ray tracing computations, the audio latency can be significantly reduced.

17 Claims, 6 Drawing Sheets

METHOD AND SYSTEM FOR IMMERSIVE VIRTUAL REALITY (VR) STREAMING WITH REDUCED GEOMETRIC ACOUSTIC AUDIO LATENCY

FIELD OF THE INVENTION

Embodiments of the present invention are related to audio data processing, and more specifically, to geometric acoustic data processing for virtual reality applications.

BACKGROUND OF THE INVENTION

While virtual reality (VR) opens up opportunities for content creators, and sports, entertainment and game broadcasters, it also brings new challenges when attempting to deliver immersive experiences to a broad base of users.

One of the most difficult challenges faced by the current VR industry is latency. For instance, video latency of more than 50 ms between a head movement and the resultant change in displayed images can lead to a detached gaming experience, and can also contribute to motion sickness and dizziness in a user. A VR system should ideally have a visual delay of less than 15 milliseconds (ms) to avoid the above issues. Similarly, audio latency can also play a major role in disrupting and breaking a user's immersion sensation. To ensure that a user feels connected to another person in real-time in VR, the audio delay between the speaker and the listener should be minimized. Studies of sensitivity to audio delay suggest that, for a user to speak comfortably with another person in a VR environment, one-way latency should be below 50 ms.

Human listeners can detect the difference between two sound sources that are placed as little as three degrees (3°) apart, about the width of a person at 10 meters. The ear on the far side of the head hears the sound slightly later than the near ear due to its greater distance from the source. Based on a typical head size (about 22 cm) and the speed of sound (about 340 m/s), an angular discrimination of 3° requires a timing precision of about 30 ms.

Geometric Acoustic (GA) modeling is the simulation of sound ray propagation in a particular spatial setting (e.g., a virtual scene setting), which can be executed by a GA processing pipeline, for example. Based on geometric information about the setting, GA processing can determine how the sound waves travel and bounce around the environment and reach a character or an object (e.g., which is controlled by a player in real-time), thus providing 3D spatialized audio data.

Typically, a geometric acoustic pipeline processes the geometry of a virtual scene along with knowledge of sound sources and receiver location by using a ray tracing algorithm and an audio processing algorithm. The ray tracing algorithm is used to compute a spatial acoustic model and generate impulse responses (IRs) that encode the delays and attenuation of sound waves traveling from a sound source to a sound receiver through different propagation paths representing transmission, reflection, and diffraction. Rays (or sound waves) are traced to generate an impulse response which represents the decay of audio energy in time at the place of the listener. Whenever the sound source, the receiver, or the objects in the scene moves, these propagation paths need to be recomputed—sometimes periodically. The audio processing algorithm is used to generate audio signals by convolving the input audio signals with the IRs. In a virtual environment such as in a game, where the geometry of the scene is known along with the positions of sound sources and a listener, Geometric Acoustics is applied to generate spatialized audio data.

In a typical client-server gaming system, a remote server performs game execution and renders on behalf of the clients that simply send input and display output frames. For providing GA audio data to the client, whenever a listening player's head moves, the new location and head position of the player is sent to the server to compute the IRs for this new position of the listener, the server then convolves the generated IRs with audio data before streaming the resultant audio frames to client. However, ray-tracing typically requires intensive computation and real-time computing; as a result, applying and rendering audio frames in this manner could significantly increase the end-to-end audio latency beyond comfortable levels.

SUMMARY OF THE INVENTION

Embodiments of this invention provide a mechanism and method of reducing audio latency in the Geometric Acoustic (GA) audio experience for immersive virtual reality (VR) streaming.

Embodiments of the present disclosure include generating audio data for rendering by using an impulse response (IR) that is pre-computed based on a predicted motion related to a user and performed prior to receiving actual positional update. More specifically, based on a current position of a virtual object that is controlled by a user during the game, a set of motions of various possible velocities and directions are predicted for the object, and a set of corresponding IRs are computed. When a positional change of the object is detected, one of the set of pre-computed IRs is advantageously selected based on the updated positional information and used to convolve with the audio data that is next in line for rendering to generate modified audio data for rendering.

In some embodiments, the server in a server-client game system may be responsible for generating regular audio frames, and the audio frames are streamed to one or more clients for rendering. The server may apply sophisticated Geographic Acoustic (GA) processing techniques—including, without limitation, ray tracing and audio processing algorithms—based on the user-related positions as supplied from the clients. A set of IRs resulting from a set of predicted possible movements of an object are opportunistically pre-computed (by the server in some embodiments), and provided to the client. At the client, as soon as a change in the object's position (e.g., location and/or orientation) is detected, the audio frames can be convolved with one or more selected pre-computed IRs to generate modified audio frames for rendering without any noticeable audio lag. Meanwhile, the updated position is sent to the server and used to generate subsequent audio frames by using more sophisticated processes, e.g., by applying ray tracing and audio process algorithms.

In some other embodiments, the server is configured to perform the convolution to modify audio frames as well as to generate the set of pre-computed IRs. The modified frames are then sent to the client for rendering.

As convolving IR(s) with audio data is computationally inexpensive relative to computing the ray-traced audio afresh for a virtual scene in real-time, the audio delay in game streaming caused by position changes can be advantageously and significantly reduced by offloading the audio processing algorithm to the client. Further, because the pre-computed IRs are readily available before the position change is actually reported, the modified frames can be generated without being affected by network latency. Therefore embodiments of this invention can lead to a substantial reduction in audio latency. With reduced latency for VR streaming, video game broadcasters and content providers will be able to stream GA audio in real-time offering enhanced user experiences.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
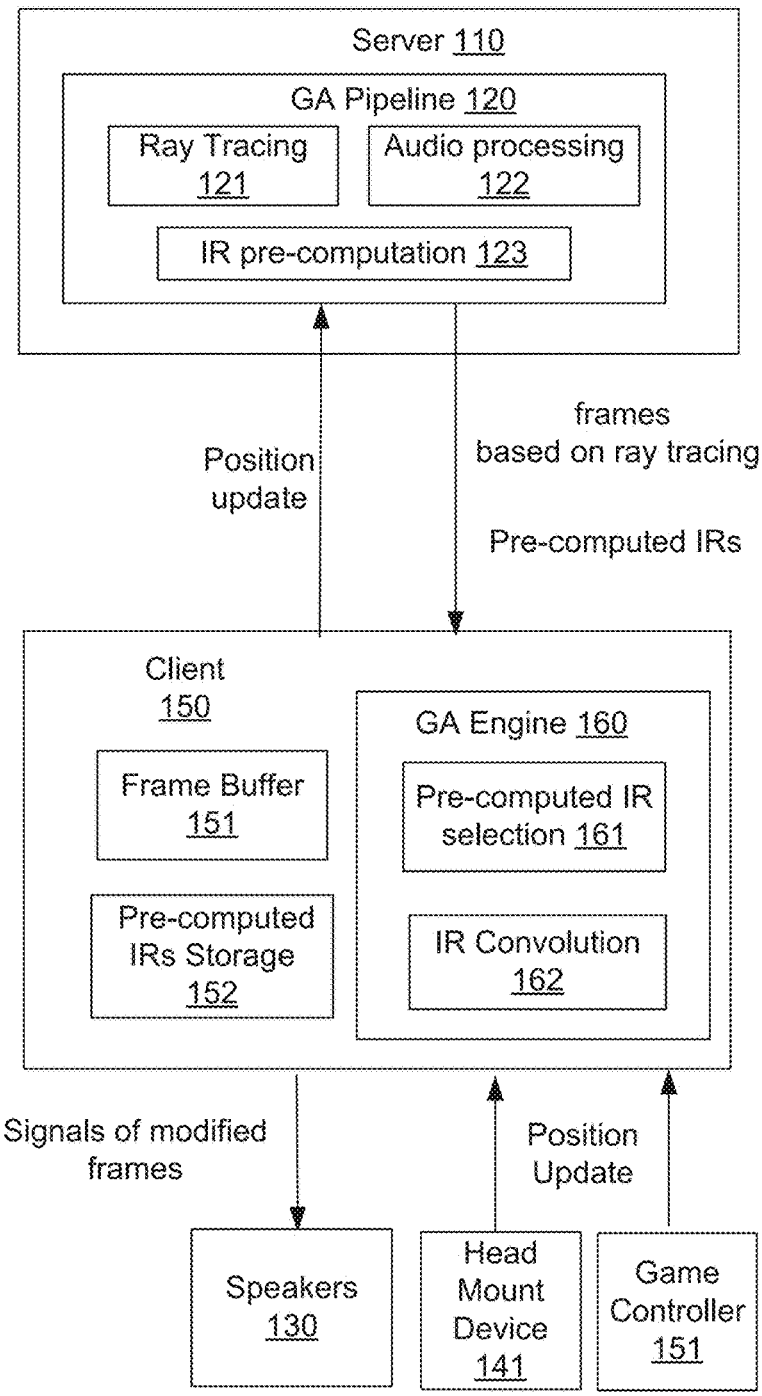
FIG. 1 is a block diagram illustrating an exemplary VR streaming system configured to modify audio frames in response to a VR object position update by using opportunistically pre-computed IRs in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "performing" or "executing" or "transforming" or "determining" or the like, refer to the action and processes of an integrated circuit, or similar electronic computing device, that manipulates and transforms data represented as physical (electronic) quantities within the computer system's registers and memories into other data similarly represented as physical quantities within the computer system memories or registers or other such information storage, transmission or display devices.

Head movements (or simulated object movements) within a VR setting can change how audio should be perceived by the user. This can be simulated by Geometric Acoustic (GA) modeling, which is the simulation of sound ray propagation in a particular spatial setting (e.g., a virtual scene setting). One aspect of the invention described here is to predict possible head or object movements, and use GA modeling to pre-calculate what those movements would mean for the sounds being played within the VR experience. By enabling these calculations to be done faster, the user has a more realistic VR experience, and the computational overhead required also decreases. Based on geometric information about the setting, GA modeling can determine how the sound waves travel and bounce around the environment and reach a character or an object (e.g., which is controlled by a player in real-time), thus providing 3D spatialized audio data. And then, if the head or object actually moves in one of the predicted ways, the appropriate pre-calculations are used to quickly generate, or render, the sounds the user should experience for the new relative positions.

Embodiments of the present invention provide a method for quickly generating audio in response to changes in a virtual reality setting. Methods in accordance with embodiments of the present invention provide fast computations of audio signals for rendering that account for movements (e.g., head or object) to provide a realistic VR experience while reducing the computational overhead required to provide the realistic sound. Embodiments perform a prediction of possible head and/or object movements and opportunistically perform pre-computations based on those predictions. When the actual movement is detected, the respective pre-computation that was performed for the correctly predicted movement is then advantageously used to quickly render the appropriate audio signal for the actual movement. Geometric Acoustic (GA) modeling is the simulation of sound ray propagation in a particular spatial setting (e.g., a virtual scene setting), which can be executed by a GA processing pipeline, for example. Based on geometric information about the setting, GA processing can determine how the sound waves travel and bounce around the environment and reach a character or an object (e.g., which is controlled by a player in real-time), thus providing 3D spatialized audio data.

More specifically, embodiments of the present disclosure provide virtual reality (VR) audio rendering systems and methods including pre-computing impulse responses (IRs) based on predicted motions of a virtual object or a user (collectively "an object" herein) to generate audio frames in a VR setting for rendering to a user. Based on a current object position and/or the VR content, a set of possible motions is predicted and a set of IRs is opportunistically pre-computed accordingly by using a Geometric Acoustic (GA) model of a virtual scene. Once an object position change is actually reported, one of the pre-computed IRs is selected and convolved with a set of audio frames to generate modified audio frames for rendering. As a result, generation and rendering of audio frames that factor in the position change and the resultant geometric acoustic changes can be accomplished with low latency because the IR is pre-computed and IR convolution is less computationally intensive than a ray-tracing process.

The present disclosure can be applied in a cloud gaming system, a client-server game streaming system, an individual game console, a Peer-to-Peer (P2P) networked game system, or any other suitable system that exploits GA simulation to generate spatialized audio data. FIG. 1 is a block diagram illustrating an exemplary VR streaming system 100 configured to modify audio frames in response to VR object position updates by using pre-computed IRs in accordance with an embodiment of the present disclosure.

In a simplified form, the VR streaming system 100 includes a server 110 and a client device 150 coupled through one or more networks. For instance, a VR game is executed at the server 110 and video and audio frames are generated and streamed to the remote client 150 for rendering. The client device is coupled to a speaker system, for example, a 7.1 channel speaker system, a head-mounted device 141 (HMD) wearable on a user's head and capable of sensing the user's position and motion, and a game controller 151 for receiving user input.

Herein position or motion related to a user refers to a position or motion of an object in a VR setting, such as a sound source object, a sound recipient object or another type of object. The object's position in the VR setting is controlled by a user through an input device. A change in the position of the object would cause a change in the geographic acoustic model. It will be appreciated that the present disclosure is not limited to any specific type of device that can detect and supply positional information and any of a number of well known devices can be used. For example, the positional information may originate from an HMD, a game controller, a keyboard, wearable sensors, etc. In this example, a user's head movements and input to the game controller 151 may change the position of a virtual object and thereby change geographic acoustics of the VR setting.

During operation, the client can receive positional update information (including location and orientation information for example) from the HMD 141 and the game controller 151 and propagate the information to the server. The server 110 is configured to execute the game application, generate changed audio and video frames based on the updated position information and render on behalf of the client 150.

More specifically, the server 110 includes a GA processing pipeline 120 including a ray tracing module 121 and an audio processing module 122. The ray tracing module 121 can compute a spatial acoustic model and generate IRs that encode the delays and attenuation of sound waves. Sound waves travelling from a sound source object to a sound recipient object travel along a multitude of propagation paths representing different sequences of transmission, reflections, diffractions and refractions at surfaces of the VR environments. Whenever an object in the virtual scene moves, these propagation paths may be recomputed to generate subsequent audio frames for rendering.

The audio processing module 122 can generate audio frames by convolving the input audio with the IRs. Rays of sound waves are traced to generate an IR which represents the delay of audio energy in the time and place of the sound recipient object. Given the geometry of the VR scene along with the positions of source sources and a recipient, GA simulation is applied to generate the spatialized VR audio frames. The audio processing performed by the GA processing pipeline 120 may use a frame number or timestamp to indicate the time when the processed audio needs to be played out and also to correlate the corresponding position.

Once new positional information (e.g., of the sound recipient as detected by the HMD) is received, the server can recompute the IRs for the new position (e.g., by using ray tracing), and convolve the new IRs with audio data to generate audio frames that are sent to the client through the network. According to embodiments of the present disclosure, the server includes an IR pre-computation module 123 operable to predict a set of possible displacements from the object's current position, and to generate a set of pre-computed IRs for those predicted possible displacements. The audio frames and the pre-computed IRs are supplied to the client 150. Thus, the pre-computed IRs can be made available to the client before the next positional change is reported to the client or the server 110.

The client 150 stores the received audio frames from the server 110 in the frame buffer 150 and the pre-computed IRs in the memory of a storage unit 152. The client 150 includes a GA engine 160 having a pre-computed IR selection module 161 and an IR convolution module 162. As soon as a change in the object's location and/or orientation is detected and supplied to the client 150, the pre-computed IR selection module 161 selects a pre-computed IR that matches the new position. For example, the selection may be performed by comparing the set of predicted positions with the detected new position. The IR convolution module 162 then convolves the selected IR with one or more buffered audio frames stored in the frame buffer 151 and thereby advantageously produces modified audio frames which are rendered through the speakers 130.

In the illustrated example, the server is configured to pre-compute IRs and provide them to the client, and the IR convolution module 162 in the client operates to perform convolution of the IR with the audio frames to generate modified frames. However, in some other embodiments, the server is operable to perform convolution using the pre-computed IR to generate modified frames, which are sent to the client for rendering.

Figure 2:
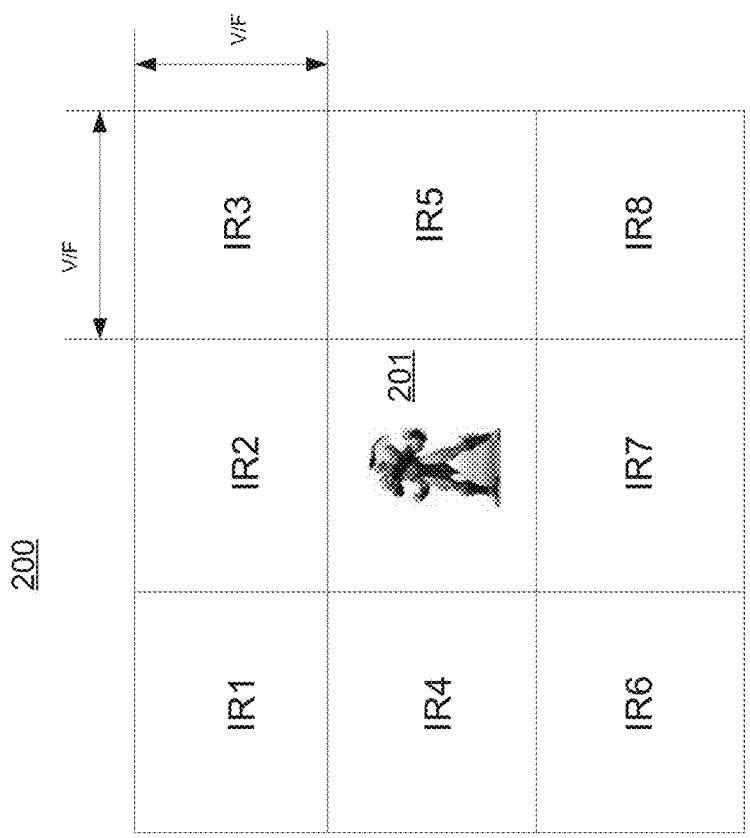
FIG. 2 illustrates an exemplary set of predicted positional changes in accordance with an embodiment of the present disclosure.

The present disclosure is not limited to any mechanism, algorithm or process used to predict a set of next possible moves of an object. FIG. 2 illustrates an exemplary set of predicted moves 200 of a virtual object in accordance with an embodiment of the present disclosure. The virtual area around the virtual object 201 (e.g., corresponding to a space around the user player who controls the object) is divided into blocks arranged in a grid and an IR is pre-computed for each block (IR1-IR8). The size of the block can be computed based on the current velocity of the user and a frame per second (FPS) value, which is readily available within the game engine at the server. For instance, if the player is moving with a velocity V meters/sec as detected by the HMD, and the FPS value is F frames/sec, then the player can move a distance of V/F meters per frame.

Accordingly, the server can compute the IRs for each square block of V/F meters around the player in multiple directions and send these down to the client. At the client end, as soon as a change in the location and/or orientation of the listener is detected, the audio frames are convolved with a matching IR of the corresponding block in the grid 200 and render real-time 3D-audio without any noticeable lag. For example, if the object 201 is moves or is caused to move to the block immediately below, IR7 is accordingly elected. Any suitable prediction algorithm(s) can be used without departing from the scope of the present disclosure. For example, an algorithm configured to reduce the chances of a miss where no predicted move matches the detected move, deep learning, and/or artificial intelligence may be used and implemented in the IR pre-computation module 123 in FIG. 1.

Figure 3:
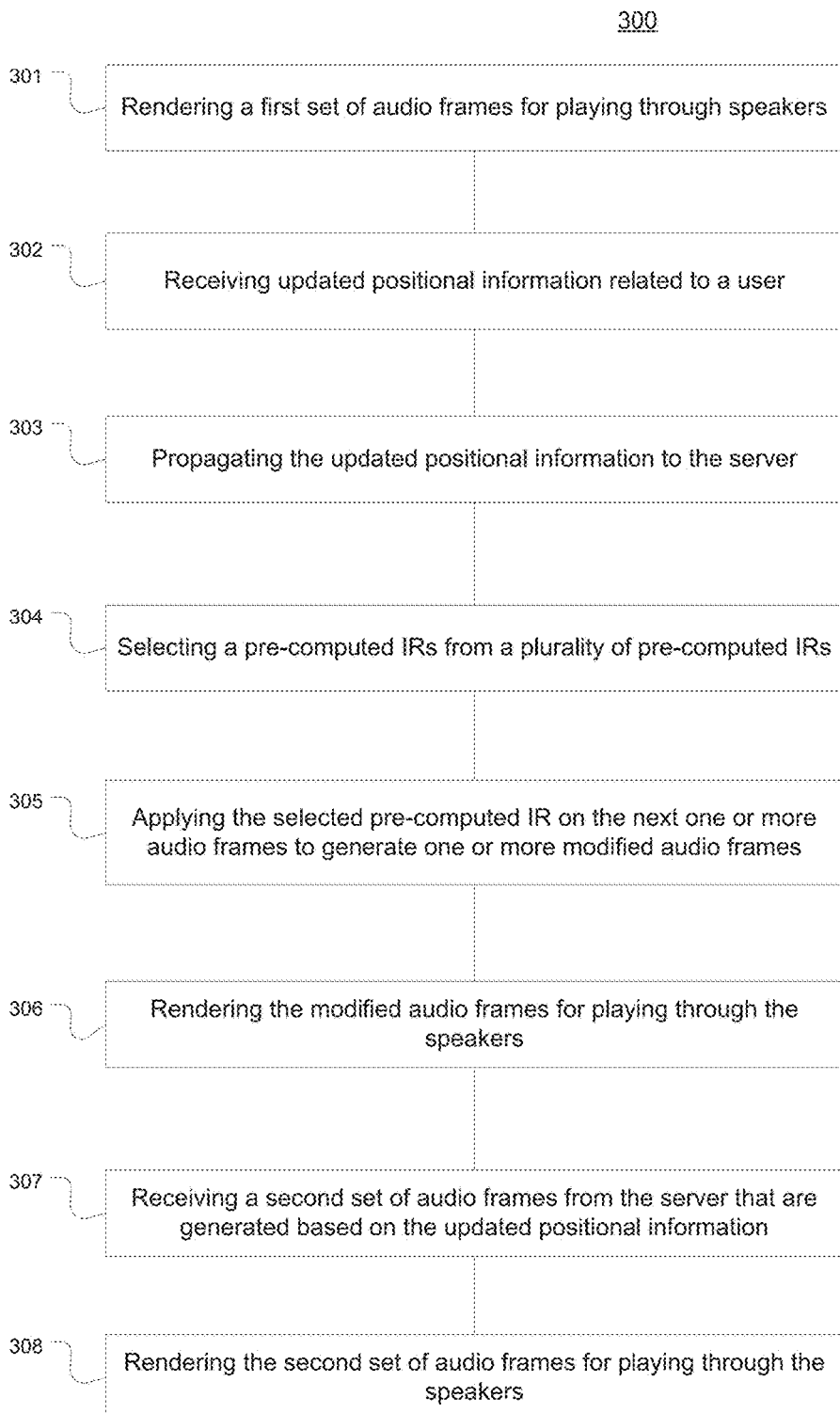
FIG. 3 is a flow chart depicting an exemplary process of generating audio frames by using pre-computed IRs in accordance with an embodiment of the present disclosure.

FIG. 3 is a flow chart depicting an exemplary process 300 of generating audio frames by using pre-computed IRs in accordance with an embodiment of the present disclosure. Process 300 may be performed at a client device, e.g., device 150 in FIG. 1. At 301, a first set of audio frames is rendered for playing through an output device (e.g., speakers). The audio frames may be generated by, and supplied through a network from, a server device, for example. At 302, updated positional information about a user player is received from an HDM device. At 303, the information is propagated from the client device to a server device and can be used by the server to generate new audio frames, e.g., including GA simulation of a related VR setting by using ray-tracing.

At 304, a set of pre-computed IRs is accessed and one of them is selected based on the updated positional information. The set of pre-computed IRs is preferably generated by the server and supplied to the client, but may also be generated locally at the client in some embodiments. The set of IRs correspond to a set of predicted possible moves of the user player from a previous position. The set of predicted moves have various velocities, directions, orientations, etc. The first set of audio frames may have been generated by the server based on this previous position.

At 305, the selected pre-computed IR is applied to modify the next one or more audio frames that have been received by the client from the server and scheduled for rendering. As noted above, the convolution with a pre-computed IR may be performed as the server in some other embodiments, and the modified frames are sent to the client. At 306, the modified audio frames are rendered by the client for playing through the output device. At 307, a second set of audio frames that are generated based on the updated positional information are received from the server, e.g., by using a ray tracing algorithm as well as an audio processing algorithm. At 308, the second set of audio frames is rendered by the client for playing through the output component.

According to preferred embodiments, before the second set of audio frames that are generated based on the updated positional information can be made available for rendering, the modified audio frames resulting from convolution with a pre-computed IR are generated locally at the client and advantageously rendered responsive to the position update. From a user's perception, there would be little or no latency between the position change and geographic acoustic effect change.

In a multi-player game environment (e.g., multi-client system), in some embodiments, the updated positional information originating from one player can be supplied to all the peer client devices participating the game, and each client independently generates modified audio frames for rendering based on a set of pre-computed IRs. However, in some other embodiments, only the instant player and optionally some selected peer players receive the updated positional information and thereby generate modified audio frames.

Figure 4:
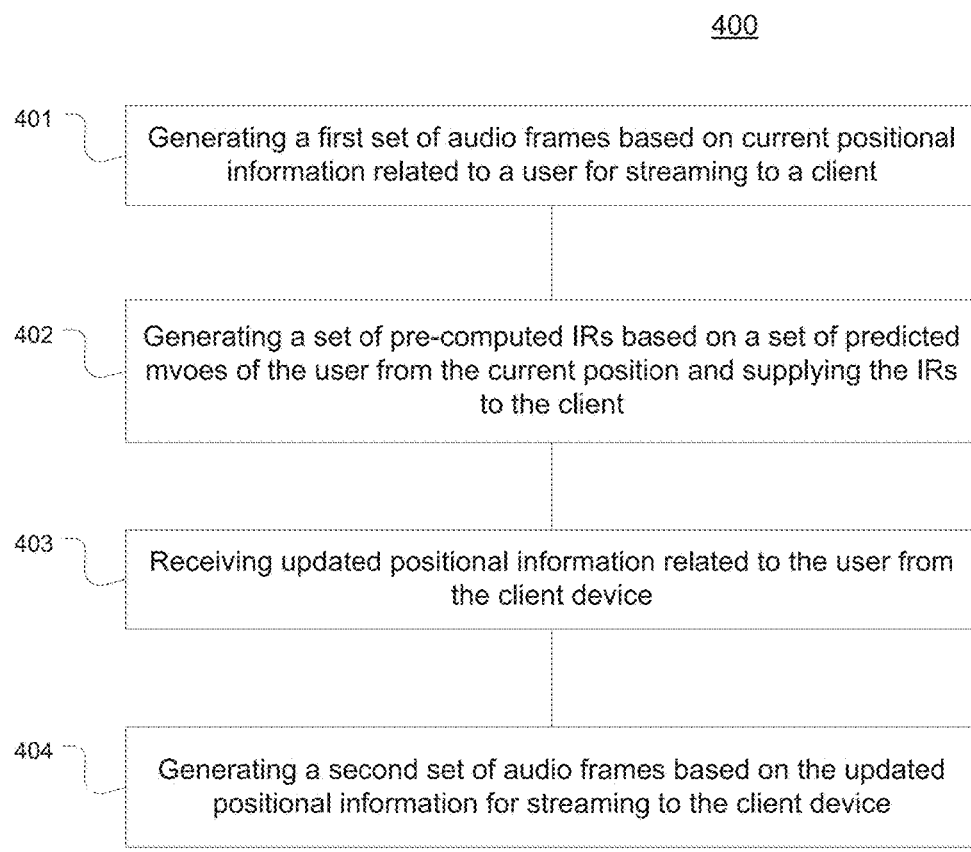
FIG. 4 is a flow chart depicting an exemplary process of generating audio frames by using GA simulation and pre-computing IRs based on predicted moves of a user player in accordance with an embodiment of the present disclosure.

FIG. 4 is a flow chart depicting an exemplary computer implemented process 400 of generating audio frames by using GA simulation and pre-computing IRs based on predicted moves of a user player in accordance with an embodiment of the present disclosure. Process 400 may be performed by a server device (e.g., 110 in FIG. 1), but may also be performed by a client device (e.g., 150 in FIG. 1), or any other suitable computation entity in a VR rendering system.

At 401, a first set of audio frames are generated based on the current positional information related to a user and are supplied to one or more clients (e.g., by streaming). At 402, a set of IRs is pre-computed based on a set of predicted moves of the user from the current position and are sent to one or more clients. The pre-computed IRs can be used by the one or more clients to generate modified audio frames once an actual positional change is detected as described in detail with reference to FIGS. 1-3. At 403, updated positional information related to the user is received from a client device. At 404, a second set of audio frames based on the updated positional information is generated and supplied to the one or more clients for streaming.

Figure 5:
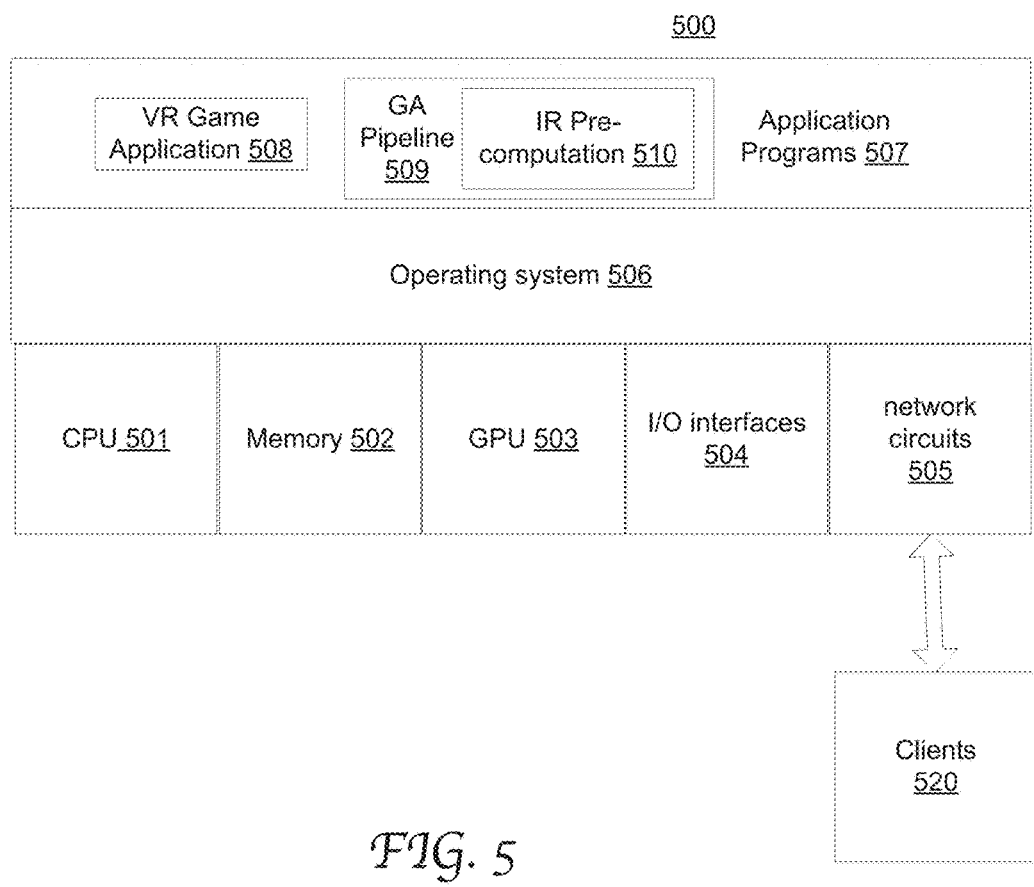
FIG. 5 is a block diagram illustrating an exemplary server device including a GA processing pipeline with an IR pre-computation module in accordance with an embodiment of the present disclosure.

FIG. 5 is a block diagram illustrating an exemplary server device 500 including a GA processing pipeline 509 with an IR pre-computation module 510 in accordance with an embodiment of the present disclosure. The service 500 may be a general-purpose computing device configured as a server in a VR game streaming system. The device 500 comprises a processor 501, a system memory 502, a GPU 503, I/O interfaces 504 and network circuits 505, an operating system 506 and application software 507 (including, for example, a VR game program 508 and the GA processing pipeline program 509 with the IR pre-computation module 510) stored in the memory 502. In the illustrated example, the computing system 500 is coupled to one or more client devices 520 through a communication network.

When receiving user input including positional information from a client 520 and executed by the CPU 501, the GA processing pipeline 509 can perform GA simulation, e.g., including ray tracing, to generate audio frames for rendering at the client device in accordance with an embodiment of the present disclosure. With respect to a received position, the IR pre-computation module 510 computes a set of IRs based on predicted possible moves. The VR game application 508 and the GA processing pipeline 509 may perform various other functions that are well known in the art as well as those discussed in details with reference to FIGS. 1-4.

Figure 6:
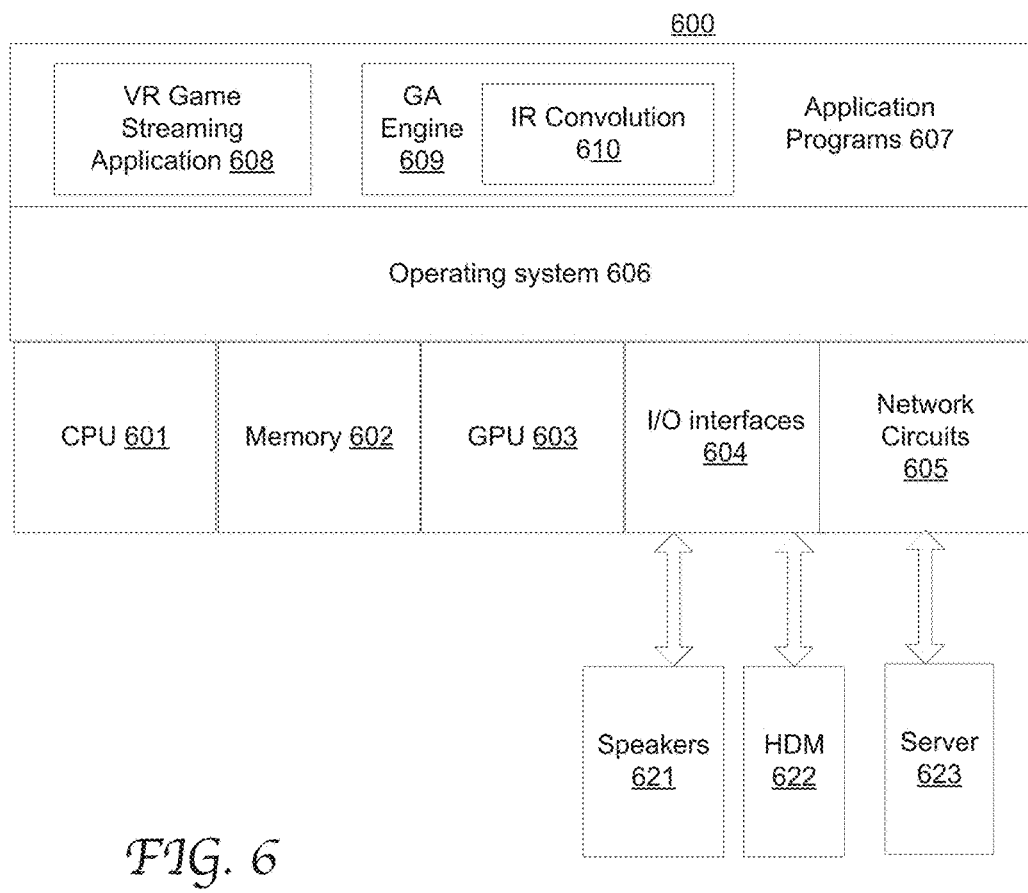
FIG. 6 is a block diagram illustrating an exemplary client device including a GA engine with an IR convolution module in accordance with an embodiment of the present disclosure.

FIG. 6 is a block diagram illustrating an exemplary client device 600 including a GA engine 609 with an IR convolution module 610 in accordance with an embodiment of the present disclosure. The device 600 may be a general-purpose computing device configured as a client in a VR game streaming system. The device 600 may be a desktop, a laptop, smart phone, touchpad, a game console, and etc. The device 600 comprises a processor 601, a system memory 602, a GPU 603, I/O interfaces 604 and network circuits 605, an operating system 606 and application software 607 stored in the memory 602, including a VR game streaming application 608, the GA engine 609 with the IR convolution module 610. In the illustrated example, the device 600 is coupled to one or more peripheral devices, such as a set of speakers 621, a HMD 622, a game controller, a keyboard, etc. Through the network circuits 605, the computing system 600 is coupled to a server 623 through a communication network.

When provided with user input, including positional information (e.g., from the HDM 622), and executed by the CPU 601, the IR convolution module can determine a selected pre-computed IR and perform convolution to modify one or more audio frames in accordance with an embodiment of the present disclosure. The VR game application 608 and the GA processing pipeline 609 may perform various other functions that are well known in the art as discussed in detail with reference to FIGS. 1-4.

As will be appreciated by those with ordinary skill in the art, the IR pre-computation module 509 in FIG. 5 and the IR convolution module 609 in FIG. 6 can be implemented in any one or more suitable programming languages that are well known to those skilled in the art, such as C, C++, Java, Python, Perl, C#, SQL, etc.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method of rendering audio in a virtual reality (VR) application, the method comprising:
   receiving, while rendering a first audio frame at an audio rendering device associated with a client device, updated positional information related to a user associated with said client device;
   selecting a pre-computed impulse response (IR) from a plurality of pre-computed IRs based on said updated positional information, wherein said plurality of pre-computed IRs correspond to different predicted motion velocities and directions from a previous position related to said user; and
   modifying a second audio frame by using said pre-computed IR to generate a modified audio frame; and
   rendering said modified audio frame at said audio rendering device.

2. The computer implemented method of claim 1, wherein said pre-computed impulse responses (IR) is generated at a server device associated with said client device.

3. The computer implemented method of claim 2, wherein said modifying said second audio frame is performed by said client device.

4. The computer implemented method of claim 1, wherein said different predicted motion velocities and directions correspond to different predicted motion velocities and directions about a virtual object that is controlled by said user.

5. The computer implemented method of claim 1 further comprising:
   sending said updated positional information from said client device for receipt by a server device; and
   receiving a set of audio frames at said client device from said server device, wherein said set of audio frames is generated by said server device based on said updated positional information by using a ray-tracing algorithm.

6. The computer implemented method of claim 1 wherein said modifying comprises convolving said second frame with said pre-computed IR.

7. The computer implemented method of claim 1, wherein said updated positional information is provided by one of a head-mounted device and a game controller associated with said client device and results from a motion of a virtual object.

8. The computer implemented method of claim 1, wherein said first and said second audio frames are generated at a server device based on said previous position by using a ray-tracing algorithm.

9. A computer implemented method of generating audio data in a virtual reality (VR) application, the method comprising:
   receiving first positional information corresponding to a first position related to a user;
   generating a first audio frame;
   computing a set of predicted movements of said user, said set of predicted movements being computed based on different predicted motion velocities and directions from said first position;
   generating a set of impulse responses (IRs) based on said set of predicted movements of said user; and
   sending said first frame and said set of IRs to a client device associated with the user for applying, by the client device, the set of IRs to the first audio frame to render a modified first audio frame.

10. The computer implemented method of claim 9 further wherein said set of predicted movements is computed based on a current motion velocity related to said user.

11. The computer implemented method of claim 9, further wherein said set of predicted movements is computed based on a current motion velocity of a virtual object and a frame rate, wherein said virtual object is controlled by said user.

12. The computer implemented method of claim 9, wherein said first audio frame is generated by using a ray-tracing process.

13. An apparatus comprising:
   a processor;
   one or more network circuits; and
   a memory coupled to said processor and storing instructions that, when executed by said processor, causes said processor to perform a method comprising:
      receiving first positional information corresponding to a first position related to a user;
      generating a first audio frame;
      computing a set of predicted movements of said user, said set of predicted movements being computed based on different predicted motion velocities and directions from said first position;
      generating a set of impulse responses (IRs) based on said set of predicted movements of said user; and
      sending said first frame and said set of IRs to a client device associated with the user for applying, by the client device, the set of IRs to the first audio frame to render a modified first audio frame.

14. The apparatus of claim 13, further wherein said set of predicted movements is computed based on a current motion velocity related to said user.

15. The apparatus of claim 13, further wherein said set of predicted movements is computed based on a current motion velocity of a virtual object and a frame rate, wherein said virtual object is controlled by said user.

16. The apparatus of claim 13, wherein said first audio frame is generated by using a ray-tracing process.

17. The apparatus of claim 13, wherein said network circuit is configured to couple said apparatus to said client device via a communication network.

\* \* \* \* \*